US010842247B2

(12) United States Patent
Wilke

(10) Patent No.: US 10,842,247 B2
(45) Date of Patent: Nov. 24, 2020

(54) DISMOUNTABLE HAMMOCK STAND

(71) Applicant: Andreas Wilke, Pähl (DE)

(72) Inventor: Andreas Wilke, Pähl (DE)

(73) Assignee: Andreas Wilke, Pähl (DE)

( * ) Notice: Subject to any disclaimer, the term of this patent is extended or adjusted under 35 U.S.C. 154(b) by 211 days.

(21) Appl. No.: 16/185,001

(22) Filed: Nov. 8, 2018

(65) Prior Publication Data

US 2019/0075915 A1    Mar. 14, 2019

Related U.S. Application Data

(63) Continuation of application No. PCT/EP2017/060916, filed on May 8, 2017.

(51) Int. Cl.
*A45F 3/24* (2006.01)
*F16M 11/24* (2006.01)

(52) U.S. Cl.
CPC ............... *A45F 3/24* (2013.01); *F16M 11/24* (2013.01)

(58) Field of Classification Search
CPC ..................................... A45F 3/24; A45F 3/22
USPC ...................................................... 5/127–129
See application file for complete search history.

(56) References Cited

U.S. PATENT DOCUMENTS

| 5,003,652 | A | * | 4/1991 | Bayless | ..................... | A45F 3/24 |
| | | | | | | 5/129 |
| 5,297,302 | A | * | 3/1994 | Anderson | ................. | A45F 3/24 |
| | | | | | | 5/127 |
| 6,931,679 | B1 | * | 8/2005 | Tseng | ........................ | A45F 3/24 |
| | | | | | | 5/127 |
| 2016/0058197 | A1 | | 3/2016 | Jungling | | |

FOREIGN PATENT DOCUMENTS

| DE | 4116675 A1 | 12/1992 |
| DE | 4443294 A1 | 3/1996 |
| EP | 0559622 A1 | 9/1993 |
| JP | H07-298923 A | 11/1995 |
| WO | 2017194467 A1 | 11/2017 |

* cited by examiner

*Primary Examiner* — Fredrick C Conley
(74) *Attorney, Agent, or Firm* — Park, Vaughan, Fleming & Dowler LLP

(57) ABSTRACT

A dismountable hammock stand comprises a base 3 to be placed on a floor and two bars 5 extending from the base. The bars are each separable into at least two parts 21, 23. The at least two parts include a pin 37 having an outer contact surface 39 and a ring 33 having an inner contact surface 35. An end portion 29 of the first part 21 includes a sleeve. The pin is provided at an end of the second part and the ring is provided within the sleeve spaced apart from an end of the first part. An end portion 31 of the second part is insertable into the sleeve until the outer contact surface abuts on the inner contact surface in order to define a position of the end of the second part within the sleeve in a direction transverse to a longitudinal direction of the sleeve.

19 Claims, 5 Drawing Sheets

DISMOUNTABLE HAMMOCK STAND

CROSS-REFERENCES TO RELATED APPLICATIONS

This application is a continuation of International Application No. PCT/EP2017/060916, filed on May 8, 2017. International Application No. PCT/EP2017/060916 claims priority to Patent Application No. 10 2016 005 652.5, filed on May 9, 2016 in Germany. The entire contents of the two above-referenced applications are incorporated by reference herein.

BACKGROUND OF THE INVENTION

The invention relates to a dismountable hammock stand.

Hammocks are typically attached to trees and parts of a building, such as walls and poles or pillars, having a suitable distance from each other and providing attachment points rigidly connected to the ground. When such attachment points are not available, special hammock stands are used. Such hammock stands include bars or frames providing attachment points spaced apart from each other and located at a height above ground such that the hammock can be suitably attached to these attachment points. Typically, the two attachment points for the hammock are spaced apart from each other by more than three meters or more than four meters, and they are located at a height above ground of more than 1.5 meters. Hammock stands have a considerable size, accordingly. The hammock, when it has been detached from the attachment points, can be folded and has relatively small packing dimensions such that it can be readily transported using a bag or similar container. Therefore, it was desirable to configure also the hammock stand such that it is dismountable so that it has small packing dimensions to be transportable as well.

An example of a dismountable hammock stand is known from DE 44 43 294 A1. This stand is made of tubes which are releasably connected with each other by tube connectors. The tube connectors include a first tube portion of a greater time diameter into which a second tube portion of smaller diameter can be inserted. When the second portion is inserted into the first tube portion, the relative position of the two tube portions can be fixed by screws orthogonally extending through walls of the tubes, wherein corresponding holes are provided in the walls of the tubes. It has been found that such dismountable hammock stands provide a sufficient stability in order to securely hold a hammock between two attachment points and to securely maintain the stability also when a user resting in the hammock starts to swing. It has been found, however, that unavoidable noise, such as clicking noise and creaking, is generated when the user is swinging in the hammock. Such noise can be annoying and disturbing.

SUMMARY

It is an object of the invention to provide a dismountable hammock stand generating a relatively small amount of disturbing noise when swinging in a hammock attached to the stand.

Embodiments of the invention provide dismountable hammock stands comprising plural bars which are separable into plural pieces and configured to provide force-locked connections between the pieces.

According to a some embodiments, a dismountable hammock stand comprises a base configured to be placed on a floor; and two bars extending from the base and having ends configured to attach a hammock thereto; wherein the bars are each separable into at least two parts; wherein the at least two parts include a pin having an outer contact surface and a ring having an inner contact surface, wherein the outer contact surface has a conical shape and/or wherein the inner contact surface has a conical shape; wherein an end portion of a first part of the at least two parts includes a sleeve; wherein the pin is provided at an end of a second part of the at least two parts and wherein the ring is provided within the sleeve spaced apart from an end of the first part, or wherein the pin is provided within the sleeve spaced apart from the end of the first part and wherein the ring is provided at the end of the second part; wherein an end portion of the second part is insertable into the sleeve until the outer contact surface of the pin abuts on the inner contact surface of the ring in order to define a position of the end of the second part within the sleeve in a direction transverse to a longitudinal direction of the sleeve; and wherein a clamp is provided on the sleeve spaced apart in a longitudinal direction from the ring and pin, respectively, in order to define a position of the end portion of the second part within the sleeve in directions transverse to the longitudinal direction of the sleeve.

When the base correctly abuts on a floor, the two bars extend in a diagonal upward direction such that end portions of the bars are sufficiently spaced apart from each other and located at a sufficient height above the floor such that a hammock can be attached to attachment points located at end regions of the bars. For example, hooks can be provided at the ends of the bars such that the hammock can be hinged to the hooks.

Each of the bars can be separated into two, three or more parts.

The inventor has found that the disturbing noise generated by the conventional dismountable hammock stands is generated in the connections between separable parts of the stand. Specifically, the connections between the separable parts of the stand are of a positive locking type, such that changing forces result in movements between the connected parts, and these movements generate the noise.

According to the embodiments, the connection between the first part and the second part includes to force-locked connections spaced apart from each other. The first force-locked connection is provided between the inner contact surface and the outer contact surface, and the second force-locked connection is provided by the clamp between the sleeve of the first part and the end portion of the second part. Herein, a distance in the longitudinal direction of the bar is provided between the ring providing the inner contact surface and the clamp.

There are two possible configurations of the ring and the pin. On the one hand, the ring providing the inner contact surface can be provided on the first part while the pin providing the outer contact surface is provided on the second part. On the other hand, the ring can be provided on the second part while the pin is provided on the first part.

Moreover, there are three configurations of the conical contact surfaces. The outer contact surface may have a conical shape while the inner contact surface does not have a conical shape; the inner contact surface may have a conical shape while the outer contact surface does not have a conical shape; and both of the outer contact surface and the inner contact surface may have conical shapes.

The outer contact surface and the inner contact surface can be surfaces having circular cross-sections. It is, however, also possible that the contact surfaces are configured such that they have a circular cross-section only in one or more circumferential sections.

According to a second embodiment, a dismountable hammock stand comprises a main tube having two ends; two bars extending from opposite ends of the main tube and having ends configured to attach a hammock thereto; a first tube socket and a second tube socket attached to a first end of the main tube; a third tube socket and a fourth tube socket attached to a second end of the main tube opposite to the first end of the main tube; and four leg tubes having first ends insertable into the tube sockets and having second ends carrying feet to be place on a floor; wherein the four tube sockets are fixed to the main tube such that, when the four leg tubes are inserted into the respective sockets and when the feet abut on a horizontal flat floor and when seen in a projection onto the floor, an angle between a direction of extension of the first tube socket and a direction of extension of the second tube socket is less than 150° and, in particular, less than 135°, and an angle between the direction of extension of the second tube socket and a direction of extension of the third tube socket is greater than 30°, and, in particular, greater than 45°.

The inventor has found that conventional hammock stands are configured such that the two leg tubes attached to an end of the main tube extend in opposite directions and orthogonally to the main tube. Since a certain play is provided between the leg tubes and the corresponding tube sockets, a translational movement of the main tube in its longitudinal direction is possible. This movement may again generate disturbing noise.

According to the embodiment, the four leg tubes extend from the main tube at angles which are, when seen in a projection onto the floor, substantially different from 90°. This configuration significantly suppresses possible movements of the main tube using a remaining play between the tube sockets and the leg tubes. Generation of noise can be significantly reduced, accordingly.

BRIEF DESCRIPTION OF THE DRAWINGS

The forgoing as well as other advantageous features of the invention will be more apparent from the following detailed description of exemplary embodiments of the invention with reference to the accompanying drawings, wherein.

DETAILED DESCRIPTION OF EXEMPLARY EMBODIMENTS

Figure 1:
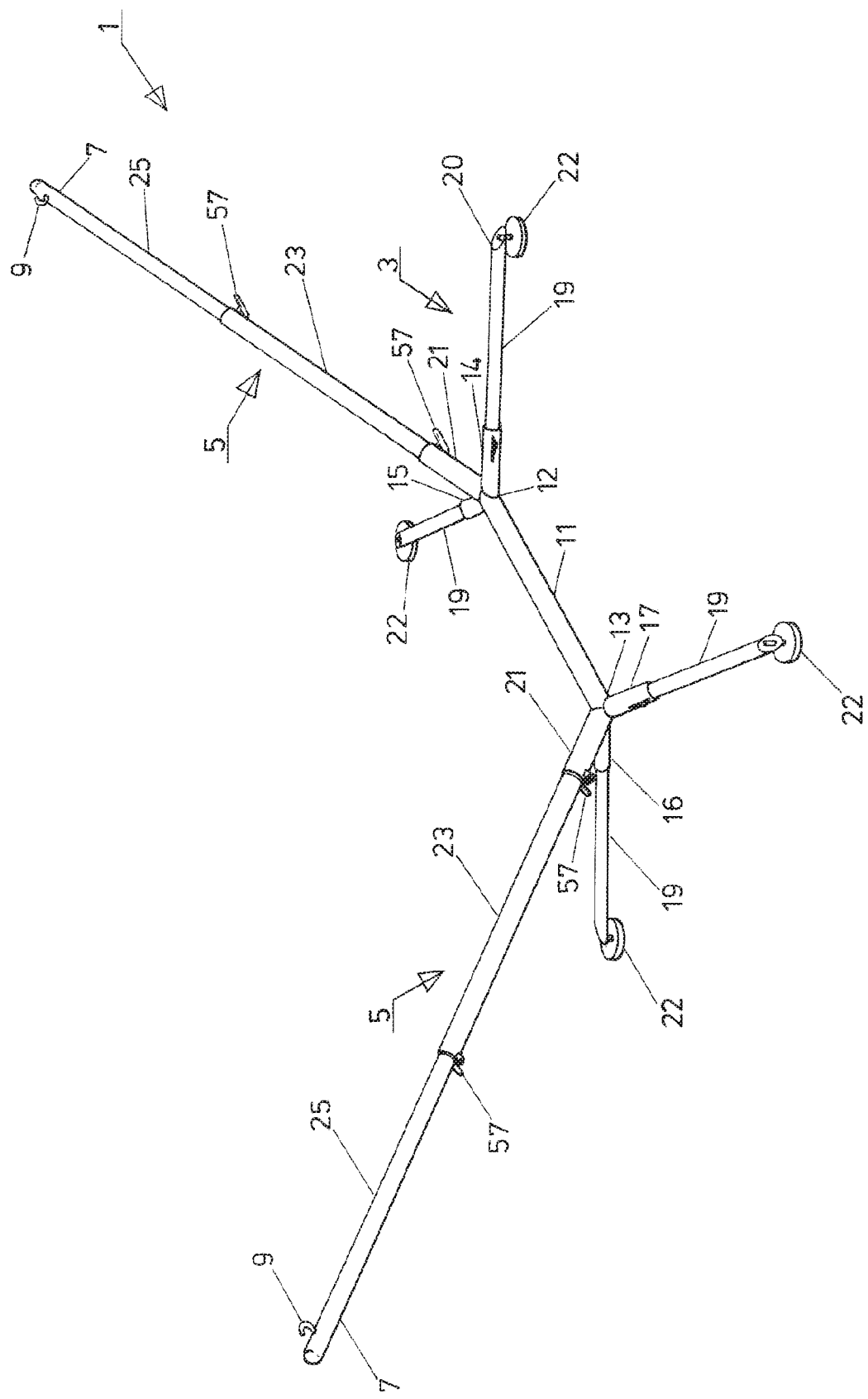
FIG. 1 is a perspective view of a dismountable hammock stand according to a first embodiment.

FIG. 1 shows an embodiment of a dismountable hammock stand. The stand 1 comprises a base to be placed on a floor, and two bars 5 extending from the base 3, wherein a hook 9 is fixed to an end portion 7 of each bar 5. A hammock, not shown in FIG. 1, can be attached to the hooks.

The hooks 9 are located at a height of about 1.5 meters above the floor and at a distance of about 4 meters from each other.

The base 3 comprises a main tube 11 having a first end 12 and a second end 13, wherein a first tube socket 14 and a second tube socket 15 are mounted on the first end 12 of the main tube 11, and wherein a third tube socket 16 and a fourth tube socket 17 are mounted on the second end 13 of the main tube 11. Four leg tubes 19 are provided, wherein each leg tube 19 is inserted into a respective one of tube sockets 14, 15, 16 and 17 with its first end. Feet 22 are mounted to second ends 20 opposite to the first ends 12 of the leg tubes 19. The feet 22 rest on a floor (not shown in FIG. 1). The feet 22 may have circular contact surfaces provided with a rubber or plastic material, for example. Moreover, the feet 22 can be configured to be vertically adjustable by providing bolts threaded into the ends 20 of the leg tubes 19, for example.

Each of the bars 5 comprises a first part 21 fixed to an end 12, 13 of the main tube 11 of the base, a second part 23 connected to the first part 21 by a releasable connection illustrated below, and a third part 25 connected to the second part 25 by the releasable connection illustrated below and which provides the end portion 7 of the bar 5.

Figure 2:
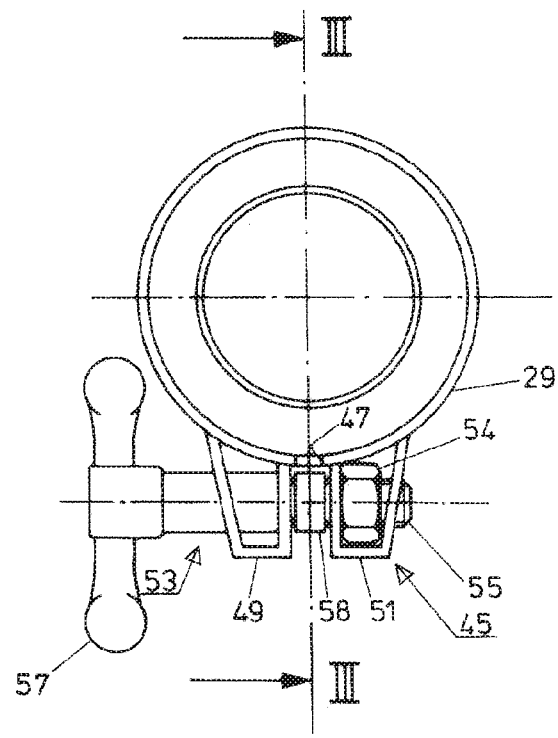
FIG. 2 is a cross-section of two connected parts of the stand of FIG. 1.
Figure 3:
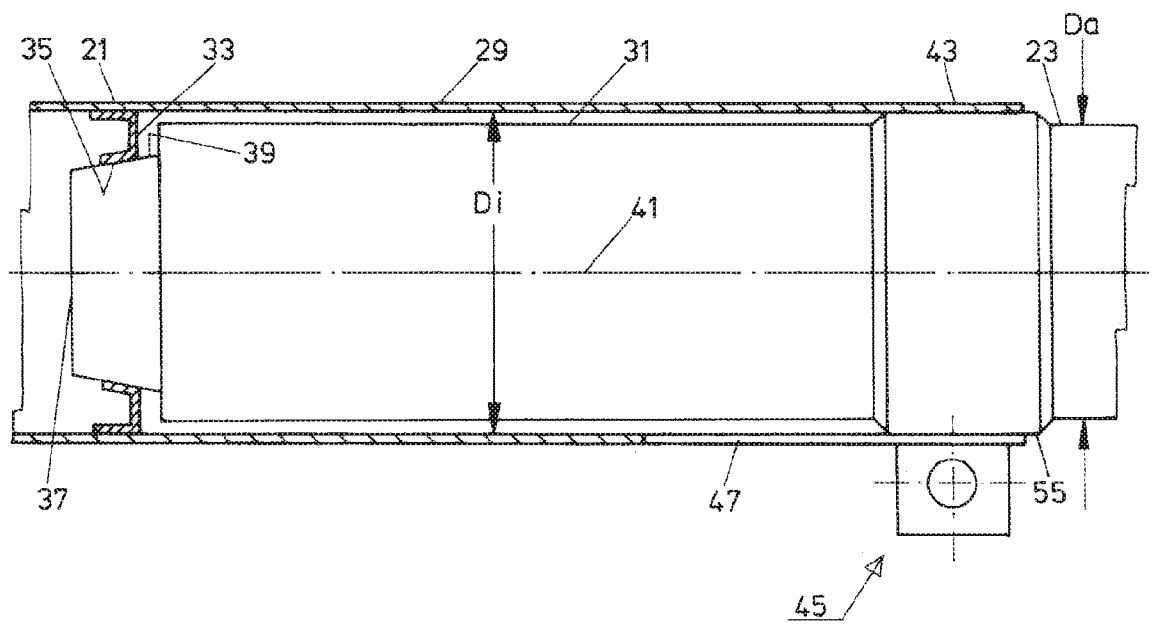
FIG. 3 is a longitudinal sectional view along a line in FIG. 2.

The releasable connection between the first part 21 and the second part 23 and between the second part 23 and the third part 25 will be illustrated below with reference to FIGS. 2 and 3. FIG. 2 is a cross-section of the releasable connection between the parts 21 and 23, and FIG. 3 is a longitudinal section of the connection along line shown in FIG. 2. The parts 21 and 23 are substantially provided by tubes, wherein an end portion 29 of the first part provides a sleeve having an inner diameter Di of 60.5 mm, for example. An end portion 31 of the second part 23 is insertable into the sleeve provided on the end portion 29 of the first part 21. The end portion 31 of the second part 23 is insertable into the sleeve to a depth defined by a contact surface provided on the first part 21 and a contact surface provided on the second part 23.

In the illustrated example, a ring 33 is mounted to the first part 21, wherein the ring 33 provides an inner contact surface 35. A pin 37 is mounted to the second part 23, wherein the pin 37 provides an outer contact surface 39. The inner contact surface 35 and the outer contact surface 39 both have conical shapes, and the diameters of the pin 37 and the ring 33 are configured such that the two contact surfaces 35 and 39 contact each other when the end portion 31 of the first part 23 is sufficiently inserted into the sleeve of the end portion 29 of the first part 21. Due to the conical shapes of the contact surfaces 35 and 39, the end of the second part 23 is centered within the end portion 29 of the first part such that the end of the first part 23 is fixed within the sleeve against movement in any direction transverse to a longitudinal axis 41 of the first part 21.

A clamp 45 is provided at an end 43 of the first part 21 in order to clamp the second part 23 to the first part 21. The clamp 45 includes a slit 47 provided in the sleeve-shaped end portion 29 of the first part 21. The slit 47 extends along the main axis 41 and may have a length of 70 mm, for example. A block 49 is mounted to the end portion 29 of the first part 21 on one side of the slit 47, while a second block 51 is mounted to the end portion 29 of the first part 21 on the other side of the slit 47. A tensioning device 53 is provided in order to generate a force pulling the two blocks 49, 45 towards each other. This is possible since the slit 47 is provided in the sleeve between the blocks 49, 45. When the two blocks 49, 45 move towards each other due to the action of the tensioning device 53, the inner diameter Di of the sleeve-shaped end portion 29 of the first part 21 is reduced in the region where the tensioning device 45 is provided.

The second part 23 is substantially formed of a tube having an outer diameter Da of 57 mm, for example. In this example, the outer diameter Da is 3.5 mm smaller than the inner diameter Di of the sleeve-shaped end portion 29 of the first part 21. Since the outer diameter Da is significantly smaller than the inner diameter Di, it is readily possible to insert the end portion 31 of the second part 23 into the sleeve shaped end portion 29 of the first part 21. However, the end portion 31 of the second part 23 comprises a collar 55 having an outer diameter which is slightly smaller than the inner diameter Di of the sleeve shaped end portion 29 of the second part 21. The outer diameter of the collar 55 is further configured such that it is possible to reduce the inner diameter of the sleeve shaped end portion 29 of the first part 21 in the region of the tensioning device 45 by manipulating the tensioning device 45 such that it becomes equal to or smaller than the outer diameter of the collar 55. It is thus possible to securely fasten the collar 55 within the sleeve shaped end portion 29 of the first part 21 by manipulating the tensioning device 45. When the fastening occurs in a situation in which the inner contact surface 35 and the outer contact surface 39 contact each other, two force-locked connections are provided between the first part 21 and the second part 23. The two force-locked connections are provided in two regions which are spaced apart in the direction of the main axis 41 of the first part 21 since the ring 33 providing the inner contact surface 35 and the blocks 49 and 51 transmitting the force of the tensioning device 45 to the sleeve shaped end portion 29 of the second part 21 are spaced apart in the longitudinal direction and may have, for example, a distance of 135 mm in the longitudinal direction.

As can be seen from FIG. 2, the tensioning device 53 of the clamp 45 may be provided by a nut 54 and a screw 55 having a butterfly handle 57. A spacer sleeve 58 can be provided between the two blocks 59 and 51 for preventing a plastic deformation of the sleeve shaped end portion 29 of the first part 21 by careless manipulation of the clamp 53 in situations when the end 21 of the first part 23 is not inserted into the sleeve shaped end portion 29 of the first part 21.

The connection between the second part 23 and the third part 25 may have a configuration similar to the configuration of the connection between the first part 21 and the second part 23 illustrated above with reference to FIGS. 2 and 3. However, the third part 25 may have an outer diameter which is smaller than the outer diameter Da of the second part 23. The parts 21, 23 and 25 have increasingly smaller outer diameters, accordingly. It is, however, also possible that the three parts into which the bar 5 is separable are configured such that their outer diameters increase with increasing distance from the base 3.

Figure 4:
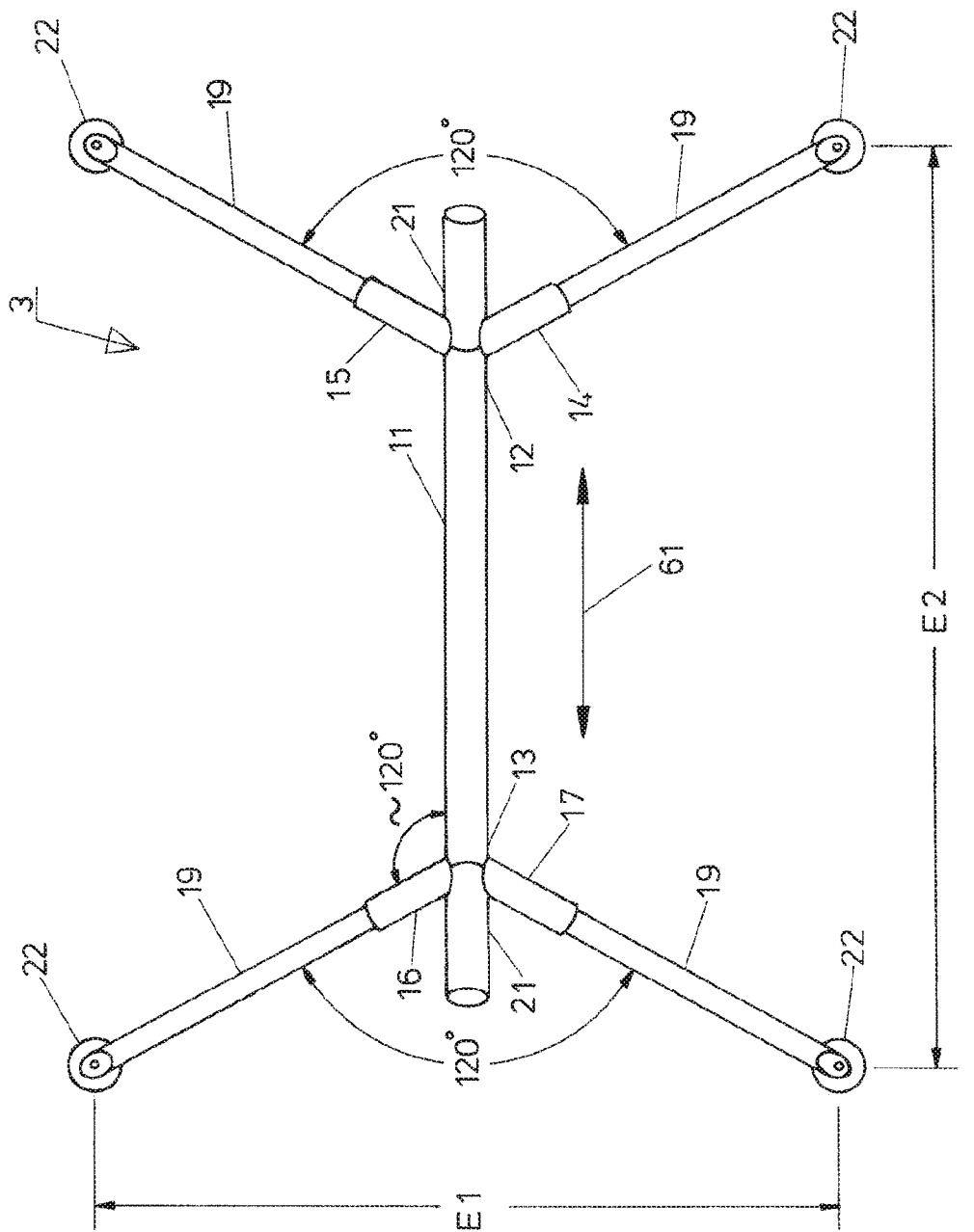
FIG. 4 illustrates a portion of the stand of FIG. 1 when seen in a projection onto a floor.

FIG. 4 shows a configuration of the base 3 when seen in a projection onto a horizontal flat floor on which the base 3 rests with the feet 21. A distance E1 between feet 22 located opposite to each other with respect to a longitudinal axis of the main tube 11 can be 1150 mm, for example. A distance E2 between feet 21 arranged on a same side of the main tube 11 can be 1400 mm, for example.

An angle between a direction of extension of the first tube socket 14 or the leg tube 19 inserted into the tube socket 14 and a direction of extension of the second tube socket 15 or the leg tube 19 inserted into the second tube socket 15 amounts to 120° in the illustrated example. Similarly, an angle between a direction of extension of the third tube socket 16 or the leg tube 19 inserted into the third tube socket 16 and a direction of extension of the fourth tube socket 17 or the leg tube 19 inserted into the fourth tube socket 17 amounts to 120° in the illustrated example. Thus, the angle between the direction of extension of the second tube socket 15 and the direction of extension of the third tube socket amounts to 60°.

This configuration of the directions of extensions of the tube sockets 14, 15, 16 and 17 or leg tubes 19 is effective in preventing a movement of the main tube 11 in a longitudinal direction 61 of the main tube 11 when swinging in the hammock. Such movement could otherwise be possible due to an elastic deformation of the components of the base and a play of the connections between the tube sockets 14, 15, 16, 17 and the respective leg tubes 19. However, such movement of the main tube 11 in the longitudinal direction 61 is substantially prevented by the adhesion of the feet 22 on the floor in the given angular configuration.

Figure 5:
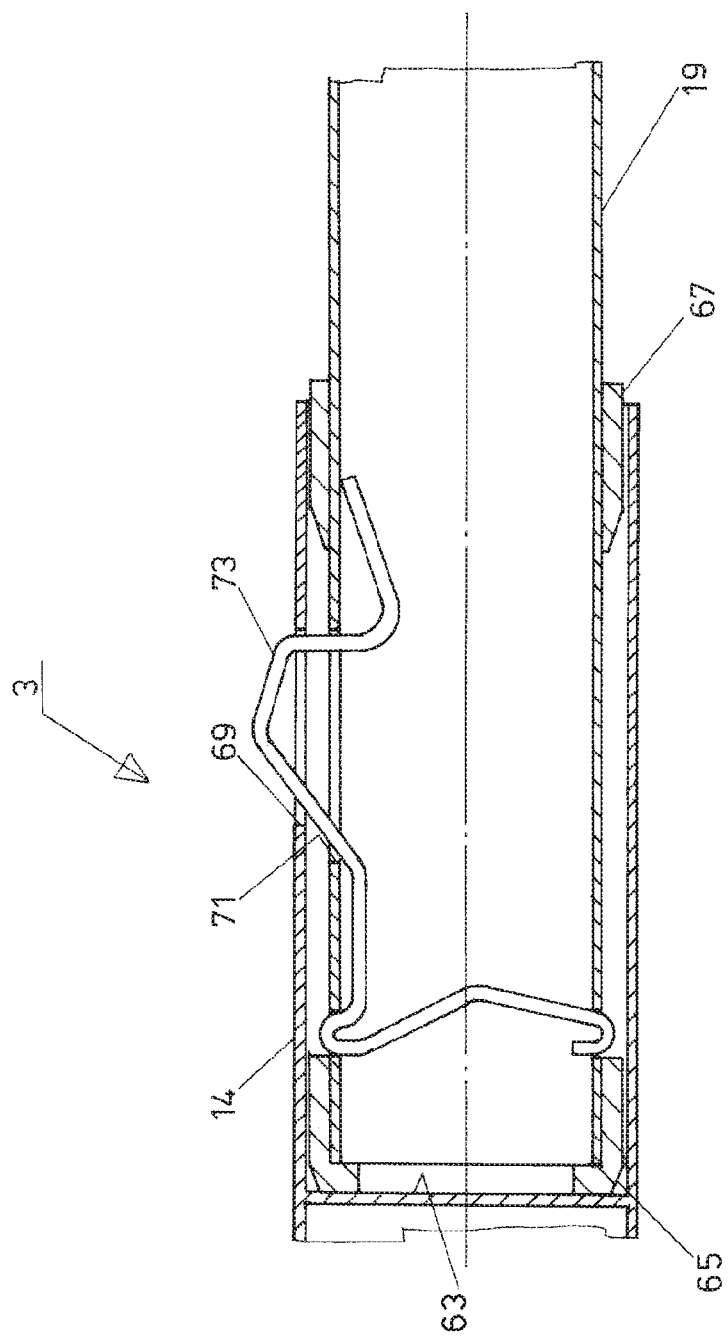
FIG. 5 is a longitudinal sectional view of a leg tube inserted into a tube socket of the stand of FIG. 1.

The connection between the tube sockets 14, 15, 16, 17 and the leg tubes 19 will be illustrated with reference to FIG. 5 below. A stopper 63 is provided in the tube socket 14. The stopper 63 limits the inserting movement of the leg tube 19 into the tube socket. A plastic sleeve 65 is provided on the end of the leg tube 19, and a further plastic sleeve 67 is provided on the leg tube 19 spaced apart from the plastic sleeve 65 such that the plastic sleeves 65 and 67 prevent that the metal tube socket 14 comes into direct contact with the metal leg tube 19 when the leg tube 19 is inserted into the tube socket 14. A longitudinal slit 69 is provided in the tube socket 14, and a longitudinal slit 17 is provided in the leg tube 19 such that a spring steel wire 73 mounted in the leg tube 19 extends through the slits 69 and 71 when the leg tube 19 is inserted into the tube socket 19 in the correct orientation. The portion of the spring steel wire 73 extending through the slit 69 is formed such that it facilitates the insertion of the leg tube 19 into the tube socket 14 while it prevents that the leg tube 19 is inadvertently pulled out of the tube socket 14. Moreover, this portion of the spring steel wire 73 can be readily pushed into the slit 69 such that the leg tube 19 can be pulled out of the tube socket 14.

The stand 1 can be dismounted by releasing the connections between the parts 21 and 23, between the parts 23 and 25 and between the tube sockets 14, 15, 16, 17 and the leg tubes 19. For example, the main tube 11 with the tube sockets 14, 15, 16, 17 fixed thereto and the first parts 21 can be packed into a first bag together with the leg tubes 19 and the legs 22, while the parts 23 and 25 can be packed into a second bag. The two bags may have a weight of 18 kg, for example, when the stand has a stable configuration and is made of stainless steel. The bags can be carried by one person. The bags may each have a length of less than 1300 mm and can be stowed and transported in a trunk of a car.

Figure 6:
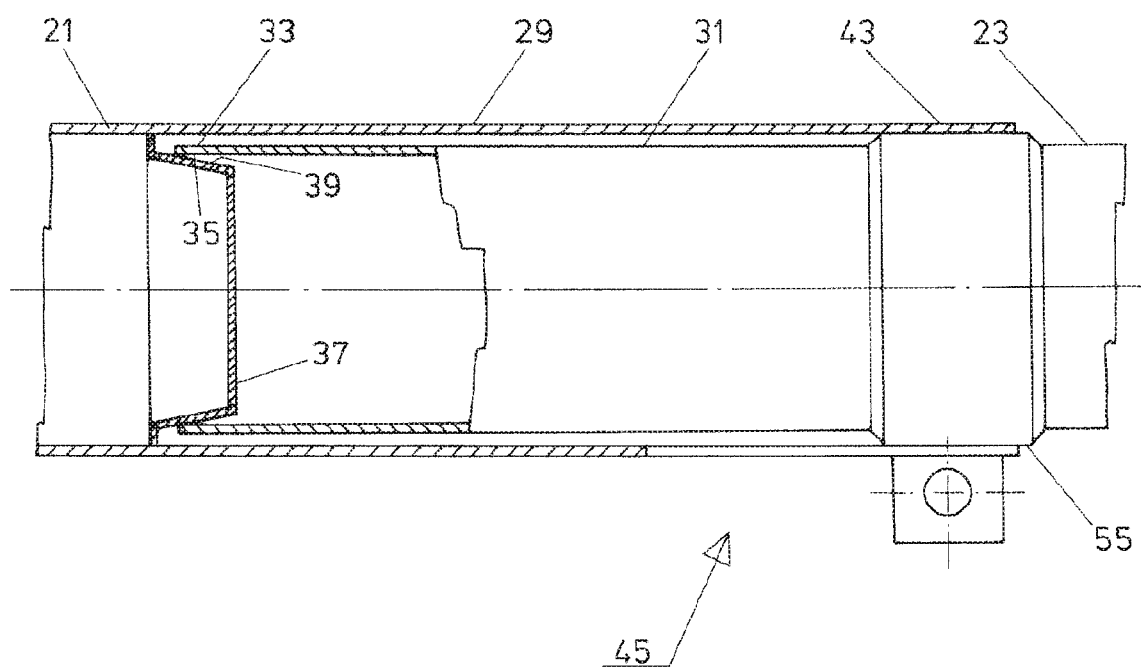
FIG. 6 is a longitudinal sectional view corresponding to FIG. 3 of two connected parts of a stand according to a second embodiment.

FIG. 6 illustrates a further embodiment of the hammock stand illustrated with reference to FIGS. 1 to 5 above. The stand of FIG. 6 has a similar configuration as the stand illustrated with reference to FIGS. 1 to 5. The stand of FIG. 6 differs from the stand illustrated with reference to FIGS. 1 to 5 with respect to the configuration of the releasable connection between the parts of the bars 5. Specifically, the pin 37 providing the outer contact surface 39 is provided on the first part 21 providing the end portion 29 formed as a sleeve. The ring 33 providing the inner contact surface 35 is directly provided by the end of the second part 23 inserted into the sleeve 29 until the inner contact surface 35 contacts the outer contact surface 39. In this embodiment, only one of the two contact surfaces 35 has a conical shape. Specifically, the outer contact surface 39 has the conical shape while the inner contact surface 33 does not have a conical shape.

The present invention has been described by way of exemplary embodiments to which it is not limited. Variations and modifications will occur to those skilled in the art without departing from the scope of the present invention as recited in the appended claims and equivalents thereof.

The invention claimed is:

1. A dismountable hammock stand, comprising:
a base configured to be placed on a floor; and
two bars extending from the base and having ends configured to attach a hammock thereto;
wherein the bars are each separable into at least two parts;
wherein the at least two parts include a pin having an outer contact surface and a ring having an inner contact surface, wherein at least one of the outer contact surface and the inner contact surface has a conical shape;
wherein an end portion of a first part of the at least two parts includes a sleeve;
wherein the pin is provided at an end of a second part of the at least two parts and wherein the ring is provided within the sleeve spaced apart from an end of the first part,
wherein an end portion of the second part is insertable into the sleeve until the outer contact surface of the pin abuts on the inner contact surface of the ring in order to define a position of the end of the second part within the sleeve in a direction transverse to a longitudinal direction of the sleeve; and
wherein a clamp is provided on the sleeve spaced apart in a longitudinal direction from the ring and pin, respectively, in order to define a position of the end portion of the second part within the sleeve in directions transverse to the longitudinal direction of the sleeve.

2. The stand according to claim 1,
wherein the sleeve includes a slit extending in the longitudinal direction, and wherein the clamp includes two blocks and a tensioning device,
wherein a first block of the two blocks is fixed to the sleeve on a first side of the slit,
wherein a second block of the two blocks is fixed to the sleeve on a second side of the slit, and
wherein the tensioning device is configured to generate a force pulling the two blocks towards each other.

3. The stand according to claim 2, wherein the tensioning device includes a butterfly handle.

4. The stand according to claim 1, wherein the first part of the bar is located closer to the base than the second part of the bar.

5. The stand according to claim 1, wherein the first part of the bar is substantially formed of a tube having an inner diameter,
wherein the second part of the bar is substantially formed of a tube having an outer diameter, and
wherein the outer diameter of the tube of the second part of the bar is smaller than the inner diameter of the tube of the first part of the bar.

6. The stand according to claim 5, wherein the second part includes a collar having an outer diameter which is greater than the outer diameter of the tube of the second part of the bar, and
wherein the collar is arranged at a distance from the end of the second part of the bar such that the collar abuts on the sleeve when the end portion of the second part is completely inserted into the sleeve.

7. A dismountable hammock stand, comprising:
a base configured to be placed on a floor; and
two bars extending from the base and having ends configured to attach a hammock thereto;
wherein the bars are each separable into at least two parts;
wherein the at least two parts include a pin having an outer contact surface and a ring having an inner contact surface, wherein at least one of the outer contact surface and the inner contact surface has a conical shape;
wherein an end portion of a first part of the at least two parts includes a sleeve;
wherein the pin is provided within the sleeve spaced apart from the end of the first part and wherein the ring is provided at the end of the second part;
wherein an end portion of the second part is insertable into the sleeve until the outer contact surface of the pin abuts on the inner contact surface of the ring in order to define a position of the end of the second part within the sleeve in a direction transverse to a longitudinal direction of the sleeve; and
wherein a clamp is provided on the sleeve spaced apart in a longitudinal direction from the ring and pin, respectively, in order to define a position of the end portion of the second part within the sleeve in directions transverse to the longitudinal direction of the sleeve.

8. The stand according to claim 7,
wherein the sleeve includes a slit extending in the longitudinal direction, and wherein the clamp includes two blocks and a tensioning device,
wherein a first block of the two blocks is fixed to the sleeve on a first side of the slit,
wherein a second block of the two blocks is fixed to the sleeve on a second side of the slit, and
wherein the tensioning device is configured to generate a force pulling the two blocks towards each other.

9. The stand according to claim 8, wherein the tensioning device includes a butterfly handle.

10. The stand according to claim 7, wherein the first part of the bar is located closer to the base than the second part of the bar.

11. The stand according to claim 7, wherein the first part of the bar is substantially formed of a tube having an inner diameter,
wherein the second part of the bar is substantially formed of a tube having an outer diameter, and
wherein the outer diameter of the tube of the second part of the bar is smaller than the inner diameter of the tube of the first part of the bar.

12. The stand according to claim 11, wherein the second part includes a collar having an outer diameter which is greater than the outer diameter of the tube of the second part of the bar, and
wherein the collar is arranged at a distance from the end of the second part of the bar such that the collar abuts on the sleeve when the end portion of the second part is completely inserted into the sleeve.

13. A dismountable stand for a hammock, comprising:
a main tube having two ends;
two bars extending from opposite ends of the main tube and having ends configured to attach a hammock thereto;
a first tube socket and a second tube socket attached to a first end of the main tube;
a third tube socket and a fourth tube socket attached to a second end of the main tube opposite to the first end of the main tube; and four leg tubes having first ends insertable into the tube sockets and having second ends carrying feet to be place on a floor;

wherein the four tube sockets are fixed to the main tube such that, when the four leg tubes are inserted into the respective sockets, when the feet abut on a horizontal flat floor, and when seen in a projection onto the floor, an angle between a direction of extension of the first tube socket and a direction of extension of the second tube socket is less than 150° and an angle between the direction of extension of the second tube socket and a direction of extension of the third tube socket is greater than 30°, and, in particular, greater than 45°.

14. The stand according claim 13, wherein the angle between the direction of extension of the first tube socket and the direction of extension of the second tube socket is less than 135°.

15. The stand according claim 13, wherein the angle between the direction of extension of the second tube socket and the direction of extension of the third tube socket is greater than 45°.

16. The stand according claim 13, wherein the four tube sockets are fixed to the main tube such that, when the four leg tubes are inserted into the respective sockets, when the feet abut on the horizontal flat floor, and when seen in a projection onto the floor, an angle between a direction of extension of the third tube socket and a direction of extension of the fourth tube socket is less than 150°, and an angle between the direction of extension of the fourth tube socket and a direction of extension of the first tube socket is greater than 30°.

17. The stand according claim 16, wherein the angle between the direction of extension of the third tube socket and the direction of extension of the fourth tube socket is less than 135°.

18. The stand according claim 16, wherein the angle between the direction of extension of the fourth tube socket and the direction of extension of the first tube socket is greater than 45°.

19. The stand according to claim 13, wherein, when the four leg tubes are inserted into the respective sockets and when the feet abut on the horizontal flat floor, the main tube is spaced apart from the floor and oriented substantially parallel to the floor.

\* \* \* \* \*